US007450472B2

(12) United States Patent
Guyvarch

(10) Patent No.: US 7,450,472 B2
(45) Date of Patent: Nov. 11, 2008

(54) DEPLOYABLE AUDIBLE PROTECTION

(75) Inventor: Jean-Paul Guyvarch, Igny (FR)

(73) Assignee: TDA Armements S.A.S. (FR)

( * ) Notice: Subject to any disclaimer, the term of this patent is extended or adjusted under 35 U.S.C. 154(b) by 0 days.

(21) Appl. No.: 11/571,563

(22) PCT Filed: Jun. 30, 2005

(86) PCT No.: PCT/EP2005/053097

§ 371 (c)(1),
(2), (4) Date: Dec. 12, 2007

(87) PCT Pub. No.: WO2006/003174

PCT Pub. Date: Jan. 12, 2006

(65) Prior Publication Data

US 2008/0225644 A1 Sep. 18, 2008

(30) Foreign Application Priority Data

Jul. 2, 2004 (FR) .................................. 04 07383

(51) Int. Cl.
*G10K 11/34* (2006.01)
*H04B 1/02* (2006.01)
*G10K 15/04* (2006.01)

(52) U.S. Cl. ...................................... 367/139; 367/138

(58) Field of Classification Search ................. 367/139, 367/138; 340/384.2
See application file for complete search history.

(56) References Cited

U.S. PATENT DOCUMENTS

| | | | | |
|---|---|---|---|---|
| 4,922,468 | A | 5/1990 | Menezes et al. | |
| 6,424,597 | B1 | 7/2002 | Bolomey et al. | |
| 2004/0151325 | A1 * | 8/2004 | Hooley et al. | 381/18 |
| 2007/0258328 | A1 * | 11/2007 | Zlotnik et al. | 367/139 |

FOREIGN PATENT DOCUMENTS

| | | | |
|---|---|---|---|
| WO | 01/08478 | A | 2/2001 |
| WO | 02/078388 | A | 10/2002 |

* cited by examiner

*Primary Examiner*—Dan Pihulic
(74) *Attorney, Agent, or Firm*—Lowe Hauptman Ham & Berner, LLP

(57) ABSTRACT

The invention relates to an acoustic protection system used to secure a determined zone of interest and to remotely control an individual or a group of individuals within this zone and with a potentially hostile behavior. The system comprises at least one set of N electro acoustic sound sources forming a network and a generator used to create N electrical signals output from a same reference and that can be controlled in phase individually. Each electrical signal is input into a determined sound source, the assembly creating a resulting emission for which the diagram depends on the direction of the zone of interest and the distribution of required active and quiet zones. The device also comprises means capable of determining the relative positions of the different sources after they have been deployed, thus limiting positioning constraints imposed on operators responsible for deployment and making the work faster. The purpose of the invention is more generally the domain of non-lethal protection devices.

15 Claims, 1 Drawing Sheet

DEPLOYABLE AUDIBLE PROTECTION

CROSS-REFERENCE TO RELATED APPLICATIONS

The present Application is based on International Application No. PCT/EP2005/053097, filed on Jun. 30, 2005, which in turn corresponds to France Application No. 04 07383, filed on Jul. 2, 2004, and priority is hereby claimed under 35 USC §119 based on these applications. Each of these applications are hereby incorporated by reference in their entirety into the present application.

FIELD OF THE INVENTION

The invention relates to an acoustic protection system used to secure a determined zone and to remotely control an individual or a group of individuals within this zone and with a potentially hostile behavior. It takes place in the more general context of protection devices.

BACKGROUND OF THE INVENTION

Sound devices are included in the different types of protection devices that can be used to remotely control an isolated individual or to disperse and disorganize a potentially dangerous group. These devices, called non-lethal sound (NLS) weapons, have many advantages in terms of their efficiency and relative harmlessness. These advantages include particularly:

Some limitation to the range related to attenuation of sound waves in free space, which can delimit the action zone of such devices. The amplitude of sound waves decreases in a known manner in proportion to the inverse of the square of the distance traveled by the wave.

The possibility of using low or very low frequencies of the order of a few tens of Hz to about a hundred Hz. In particular, these audible frequencies have a mechanical effect on the human internal ear. These effects usually cause nausea in man or even losses of equilibrium and thus prevent forward movement.

The lack of persistent physiological effects in the long term for an emitted sound level not exceeding a certain threshold, the annoyance caused to individuals suffering from the acoustic wave disappearing as soon as the emission stops.

These advantages of control and reversibility of effects advantageously distinguish NLS from other types of mechanical and electromechanical devices that can also be used in similar circumstances.

On the other hand, existing sound protection devices have some well known disadvantages, particularly related to the low frequencies used.

A first disadvantage is in the difficulties that arise when it is required to generate very strong sound levels, of the order of 130 dB necessary to make the device efficient. This operation usually requires the use of large volume and heavy equipments, for example such as enormous loudspeaker enclosures, for which fast deployment and installation cannot be expected.

A second disadvantage is due to the lack of directivity of acoustic protection devices using compact equipment forming a unique acoustic source. For such sources, the insonification diagram covers a wide zone and in particular can include the area in which the user of the system is located. This disadvantage makes it difficult to control collateral effects.

A third disadvantage is also worth mentioning, due to the logistics, transport and implementation disadvantages of existing devices. This disadvantage is particularly severe in the case of systems using pneumatic or thermal energy sources, for example based on combustible gases, such as sources using quarter wave resonator tubes.

SUMMARY OF THE INVENTION

The purpose of this invention is to overcome the above mentioned disadvantages, and particularly to propose a system enabling simple handling and fast deployment, while providing precise control over emitted acoustic levels and over the location and size of insonification zones. It is thus possible to define prohibited zones within a zone of interest in which intense insonification is applied, and also "quiet" zones in which insonification is less intense, for use by operators who are implementing the system.

To achieve this, the purpose of the invention is a deployable sound protection device comprising several networked compact electro acoustic sources, the emissions of which are combined in phase so as to obtain insonification with the required diagram.

The system according to the invention advantageously comprises means of knowing the relative position of the different electro acoustic sources and determining the required in-phase combination law.

The system according to the invention also has the advantage that it uses an electrical energy source that is available.

Another advantage of the system is that it is simple to deploy, the positioning on the ground of the different electro acoustic sources not necessarily requiring high precision.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

Other specific features and advantages will become clearer after reading the following description with reference to the appended figures, wherein.

DETAILED DESCRIPTION OF THE DRAWINGS

Figure 1:
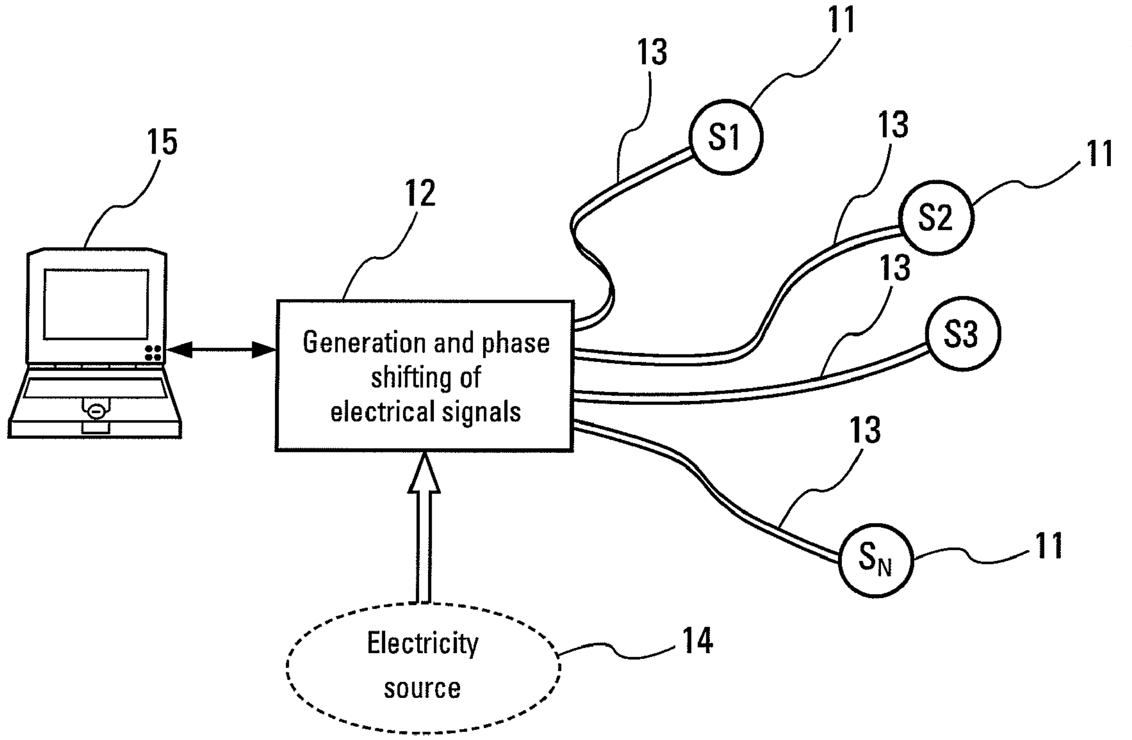
FIG. 1 is a block diagram presenting elements in the system according to the invention.

The present invention is illustrated by way of example, and not by limitation, in the figures of the accompanying drawings, wherein elements having the same reference numeral designations represent like elements throughout and wherein:

As shown in FIG. 1, the system according to the invention comprises N sound sources distributed at different locations in the zone of interest. The sound sources consist of passive electro acoustic sources 11 powered by an external low frequency electrical signal. They typically consist of a transducer and a resonance box. For example, the transducer may be a high power loudspeaker designed for reproduction of low frequencies and mounted on an appropriate baffle. The resonance box is made of rigid and air tight materials. It may for example be of the “Helmholtz cavity” type or a “quarter wave” resonator tube.

Such loud-speakers have the advantage of being easily reproducible and enabling the production of several sources with approximately identical performances. But—transducer of other types can also be used, for example such as sonar transducers by adapting the frequency of these transducers to needs.

Electrical signals synthesized by a high power generator 12 that outputs an electrical signal for each source starting from the same reference signal, are input to the electro acoustic generators that make up the N sources 11. The signals aimed at each of the sources are out of phase with each other. Phases are shifted by a phase shifting device that may be built into the generator or it may be a separate element. The phase shifting device can apply an adjustable phase to each signal. The N sources 11 are also connected to a generator, for example using two-wire electrical connections 13. Connections between sources and the generator are electrical connections, and are not affected much by attenuation and therefore can be several meters long.

The application of a specific phase shift to each signal input to the electro acoustic sources 11, can create an network of sources with a determined direction of emission and shape diagram, provided that the relative positions of the sources are known.

This reference power signal can be divided into N signals with adjustable phase using passive means such as transformers, adjustable induction coils or capacitors. But more advantageously, it can be done by well known off-the-shelf active means.

The signals output to the sound sources 11 are necessarily high power signals, of the order of several hundred to several thousand watts. This is why the generator itself is a very high power device that requires a power supply 14 sized accordingly. For example, generator used for this purpose may be powered by the local electricity distribution network for example at 220V-50 Hz, or by one or several mobile electricity generating sets. The system according to the invention then has the advantage of physically associating sound sources 11 to be deployed on the zone of the energy means. One consequence of this is that it makes handling of the sources easier than in systems known according to prior art.

The structure of the system according to the invention has the advantage of separating the production of high power signals done in a centralized manner by the generator 14, from the production of sound signals produced by electro acoustic sources 11. Thus, the electro acoustic sources are lighter in weight and therefore easier to deploy on the zone of interest.

In order to achieve manual or automatic overall control, the system according to the invention is also provided with a computer 15 with a user interface. In particular, this computer calculates the value of the phase shift to be applied to each signal output from the generator 14 as a function of the required acoustic emission diagram.

The system according to the invention is implemented by deploying the different electro acoustic sources 11 on the zone of interest, connecting them to the generator 12 and connecting the generator to the computer 15 and to an electrical energy source 14. The system is then started, and an electrical signal at a given phase with respect to the reference signal is applied to each acoustic source. The result is thus a network of acoustic sources for which operation may be described as follows in a simplified manner.

The simplifying assumption is made that the N electro acoustic sources 11 are point sources in relation to the wavelength of the signal emitted and that the emitted signal is considered as a pure sine curve (continuous narrow band signal). The sources 11 are also chosen to emit the same level.

Sources are arranged on the site and are located by their relative coordinates (x1, y1, z1), (x2, y2, z2), . . . , (xn, yn, zn).

A point C with coordinates (xc, yc, zc) is moreover considered. For example, this point may be the centre of the zone of interest.

The acoustic laws tell us that the sound signal will be maximum at point C if the signals output from the N sources 11 arrive at point C in phase.

If $d_{1C}$, $d_{2C}$, $d_{NC}$ are the distances of the sources from the target, and $\phi_1, \phi_2, \ldots \phi_N$ are the phase corrections made, and $\lambda$ is the wavelength of the emitted signals, then the signals emitted by the different sound sources will arrive in phase at point C if the following relations are satisfied:

$$\phi_1+2\Pi d_{1C}/\lambda=2k_1\Pi+a$$

$$\phi_2+2\Pi d_{2C}/\lambda=2k_2\Pi+a$$

$$\phi_N+2\Pi d_{NC}/\lambda=2k_N\Pi+a$$

In these relations, $k_1, k_2, \ldots k_N$ are integer numbers that can be determined in particular as functions of the position of the different sources 11 with respect to each other. Furthermore, is a constant term that can simply be chosen to be equal to zero.

Using these relations and knowing the relative positions of the sources 11 and the position of the target, the computer of the device according to the invention can very simply calculate phase corrections to be made to obtain a maximum amplitude signal in a zone surrounding point C.

Then, to obtain a signal with minimum amplitude in specific so-called “quiet” zones, and particularly in zones in which the operator is moving around, the optimum phase law described above simply needs to be slightly modified, without modifying the amplitudes of the emitted signals, assumed to be equal, such that the vector sum of the signals at the centre of the quiet zones is practically zero.

The calculation of the phase equations used to create a network of sound sources with an insonification diagram with maximum and minimum is not described in this document. It uses digital calculation techniques similar to those used for radar antenna arrays well known to radar and acoustics engineers (submarine and aerial acoustics). These techniques involve digital optimization to find control equations maximizing the signal at a point, subject to the constraint of minimizing it at other points. For example, these methods include so-called “phase only nulling” methods used for radar electronic scanning antennas.

Networking of several compact electroacoustic sources can give a gain in sound volume. If N sources are networked, then an associated maximum gain factor equal to 20 Log (N) in decibels can then be expected. Networking also enables an increased directivity, knowing that as a first approximation, the width of the radiation diagram is a function proportional to the wavelength of the acoustic signal and inversely proportional to the size of the network.

As can be observed from reading the above description, the principles for use and operation of the system according to the invention appear relatively simple. This simplicity advantageously satisfies requirements of speed of placement of the device if a fast action is necessary. The deployment of sources on the zone of interest is only subjected to positioning requirements that are easy to meet. In particular, it is sufficient if the sources are positioned such that the spacing between sources is equal to at least a half wavelength, so as to limit coupling problems between sources and to assure optimum operation of the network. The sources S1, S2, . . . , $S_N$ must also preferably be arranged on the same side of the base, so as to avoid any ambiguity elimination problems.

Concerning the positioning of sources, it should be observed that this positioning determines the width of the network made up, that itself determines the directivity of this network along an axis perpendicular to (S1 . . . $S_N$). As a first approximation, we can write:

$$\theta = \frac{\lambda}{d}$$

where θ is the width of the radiation diagram at 3 dB expressed in radians, λ is the wavelength of the acoustic signal and d is the width of the network.

Performances obtained with such a system particularly in terms of range depend on the number of sources used, the characteristics of the sources and the geometry of the network, but in practice level differences between quiet zones and maximum insonification zones of more than 20 dB are easily achievable.

The factor necessary to achieve this simplicity of use is that the system according to the invention must be capable of positioning the sources and particularly determining the relative position of the sources with respect to each other. This determination must be done with a relatively high precision, typically of the order of one centimeter.

This positioning can be done by adding complementary equipment to the system. For example, it will be possible to equip each source with a GPS receiver and a wired or radio digital link with the system computer, the computer then calculating the relative positions of the targets. It would also be possible to conceive any other appropriate measurement means, for example optical or radio means. However, such means of determining the relative position of the targets have the disadvantage of requiring that physical elements are added to the system with the sole role of measuring the position of the sources. These elements tend to make the system less easy to deploy, apart from the fact that they increase the complexity of the assembly.

Figure 2:
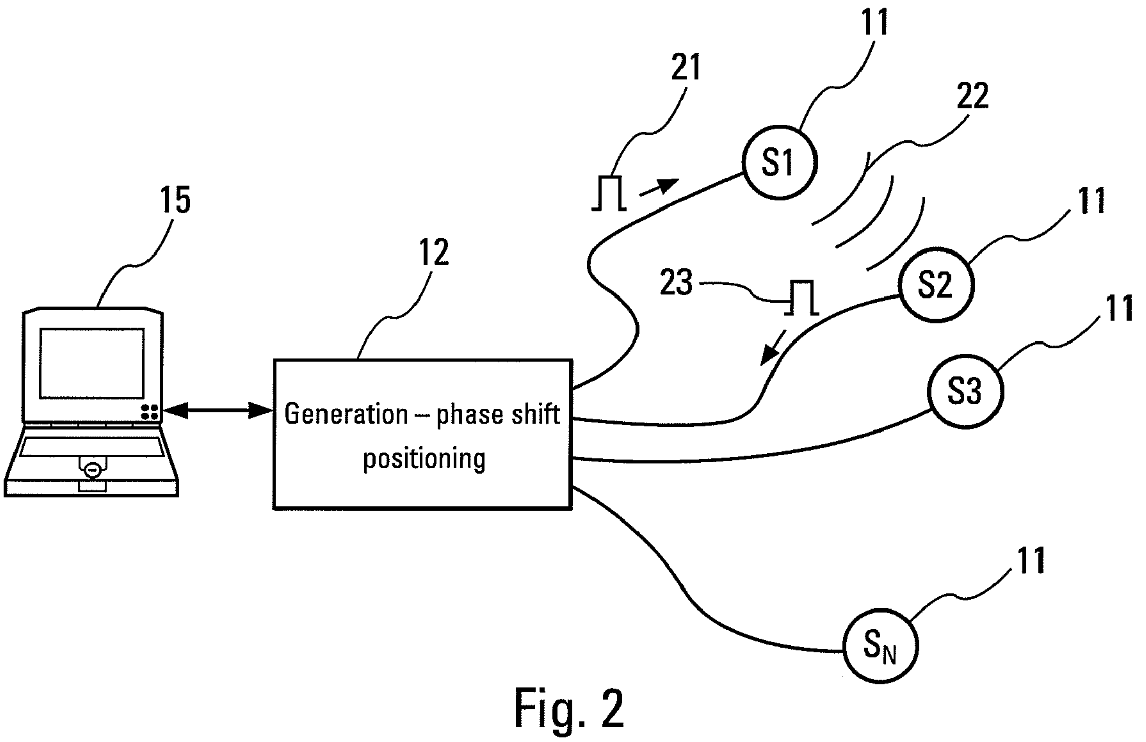
FIG. 2 is a diagrammatic illustration of the method of determining the relative position of electro acoustic sources.

In one preferred embodiment, the system according to the invention makes positioning by measuring the acoustic propagation delay time and doing a triangulation calculation based on the principle illustrated in FIG. 2, to precisely determine the relative position of the different sources after deployment. The measurement principle is described for the case of sources deployed on a flat site, in order to simplify the description. Obviously, this positioning method can be generalized.

This method consists in measuring the distances between ($S_1$, $S_2$), ($S_1$, $S_3$), ($S_1$, $S_N$), ($S_N$, $S_2$), ($S_N$, $S_3$) that define the triangles ($S_1$, $S_2$, $S_N$) and ($S_1$, $S_3$, $S_N$) that have a common base ($S_1$, $S_N$), with an ambiguity of symmetry about this base, and this ambiguity can be eliminated by applying a minor constraint in the deployment of sources, for example the orientation of sources in a single half-plane about the base. The purpose is to use any known geometric process to determine the relative position of the sources $S_1$, $S_2$, $S_N$.

The measurement process applied to sources $S_1$ and $S_2$ taken as an example may be described by the following steps:

The generator sends an electric pulse 21 at time to on the electrical link to $S_1$, which makes $S_1$ emit the sound wave 22 (damped sine curve at the resonant frequency).

Reception by $S_2$ of the emitted wave after a propagation time. If the source comprises a loudspeaker allowing the microphone function, then the loudspeaker receives the wave emitted by $S_1$. If not, $S_2$ must comprise a separate microphone that can be used for positioning operations.

$S_2$ sends an electrical signal 23 corresponding to the received sound, to the generator. This is done through the electrical link connecting $S_2$ to the generator.

The delay between the emitted pulse 21 and the received signal 23 is measured, after amplification and shaping, the measured delay corresponding mainly to acoustic propagation between S1 and S2, electrical transmission delays of the signals being negligible compared with the sound signal propagation time, and furthermore can be calculated.

Determination of the distance separating $S_1$ and $S_2$ by the computer.

The delay calculation operation is thus repeated once for each source in the system.

The number of sources is necessarily very limited, in practice less than about 20, to facilitate implementation on the site. Therefore, the calculation workload for the positioning operation of the sources 11 and to calculate the phase shifts to be applied to the different electrical signals exciting the sources, is limited. There are no problems with the execution of these different tasks in real time by an off-the-shelf computer, for example a portable PC.

Such a positioning method is a priori very advantageous because it only requires a small amount of equipments in addition to elements already used to perform the main function of the system that is protection. Furthermore, Therefore, the system as described in the above text is an advantageous solution to the problem that arises by producing an acoustic protection system without the disadvantages of prior art. Its main advantages are firstly the separation of the different elements making up this system, and the ease and composition of a source network, that does not require precise positioning of the sources with respect to each other and that enables easy operational deployment.

Due to its networked structure of sources, the system according to the invention also has the important advantage that it enables the formation of an insonification diagram with active zones and quiet zones.

The acoustic solution described above has the minor disadvantage of being sensitive to wind. Therefore, the propagation velocity of sound in air depends on various parameters (temperature, pressure, etc.). Since the final purpose is to adjust the delay of these acoustic signals to the zone of interest, this measurement of the propagation time is the most relevant parameters to be measured. The only disadvantage is in the disturbance to this measurement caused by the wind, for which the directional vector at a given instant makes different angles with the vectors (S1, S2), . . . , (S1, SN). However, this disturbance may be compensated, for example using an anemometer type device capable of measuring the wind speed and making an appropriate correction to the measured delays. In all cases, this solution appears to be simpler and easier to implement than other possible solutions using the same triangulation principle starting from delayed measurements on electromagnetic, radio or light pulses, which have the advantage of being independent of the wind velocity, but also have the related disadvantage that they cannot automatically compensate for dispersions in the propagation velocity of sound in air. These solutions also have the disadvantage that they require the installation of additional means on sources, for example such as an emitter-receiver and an antenna.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A sound system deployable of land for the protection of a zone of interest against an individual or a group of individuals with hostile behavior, the sound system comprising:

a set of N sound sources capable of emitting high power sounds on the zone of interest, a generator of high power electrical signals outputting N electrical signals with the same frequency, the same amplitude and in phase, starting from a single reference signal, each of the signals being sent to one of the sound sources, means for separately modifying the phase of each of the N signals sent to the sources, a computer capable of managing the system and controlling means of modifying the phase of the generated signals, means of identifying the relative positions of the different sound sources after their deployment in different locations within the zone of interest, said relative positions being calculated by the computer and used by the computer to determine the phase to be applied to each of the N signals; wherein a network of acoustic sources is created capable of sending a sound wave with an intensity that varies selectively in the zone of interest to create quiet zones in which the signal intensity is low and active zones in which the intensity of the signal is high.

2. The system is claimed in claim 1, wherein said means of identifying the relative positions of the different sound sources after their deployment determines the position of the different sources by measuring acoustic propagation delays between the N sources taken in pairs and calculates the position of the different sources by triangulation.

3. The system as claimed in claim 1, wherein each acoustic source in the network comprises means of receiving sound emitted by the other sources.

4. The system as claimed in claim 3, wherein said means of receiving sound includes a microphone.

5. The system as claimed in claim 2, wherein each acoustic source in the network comprises means of receiving sound emitted by the other sources.

6. The system as claimed in claim 5, wherein said means of receiving sound includes a microphone.

7. The system as claimed in claim 5, wherein the sound sources are electro acoustic sources, said electro acoustic sources comprising high power loudspeakers.

8. The system as claimed in claim 6, wherein the sound sources are electro acoustic sources, said electro acoustic sources comprising high power loudspeakers.

9. The system as claimed in claim 5, wherein the sound sources comprise piezoelectric transducers.

10. The system as claimed in claim 6, wherein the sound sources comprise piezoelectric transducers.

11. The system as claimed in claim 7, wherein the means for modifying the phase comprise passive phase shift circuits.

12. The system as claimed in claim 8, wherein the means for modifying the phase comprise passive phase shift circuits.

13. The system as claimed in claim 7, wherein the means for modifying the phase comprise active phase shift circuits.

14. The system as claimed in claim 8, wherein the means for modifying the phase comprise active phase shift circuits.

15. The system as claimed in claim 8, wherein the sound signals emitted are low frequency signals.

* * * * *